Oct. 24, 1967 J. A. J. REES 3,348,380
POWER PLANT FOR VTOL OR STOL AIRCRAFT HAVING MEANS TO
AUGMENT JET THRUST WHEN THE SAME IS
DIRECTED VERTICALLY
Filed Jan. 5, 1966
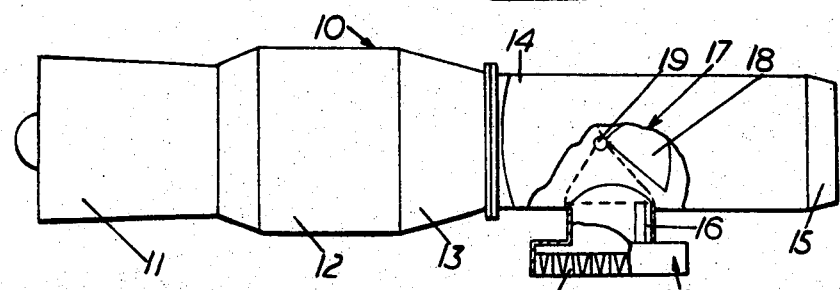
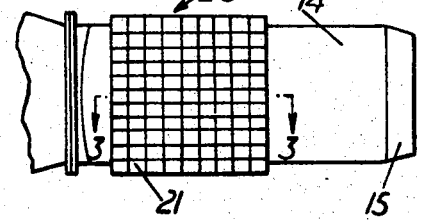
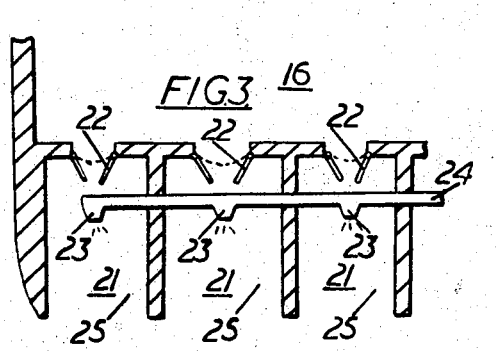
Inventor
John Anthony Jones Rees
By
Cushman, Darby & Cushman
Attorneys United States Patent Office 3,348,380
Patented Oct. 24, 1967

3,348,380
POWER PLANT FOR VTOL OR STOL AIRCRAFT HAVING MEANS TO AUGMENT JET THRUST WHEN THE SAME IS DIRECTED VERTICALLY
John A. J. Rees, Weybridge, England, assignor to Rolls-Royce Limited, Derbyshire, England, a British company
Filed Jan. 5, 1966, Ser. No. 518,946
Claims priority, application Great Britain, Jan. 11, 1965, 1,258/65
4 Claims. (Cl. 60—229)

ABSTRACT OF THE DISCLOSURE

A jet propulsion power plant for use in VTOL or STOL aircraft and including a gas turbine engine mounted on an axis generally paralleled to the longitudinal axis of the aircraft, the engine having a jet pipe with a forward propulsion nozzle at its downstream end, and a downwardly directed nozzle assembly communicating with the jet pipe by a suitable valve device for producing direct lift. The downwardly directed nozzle assembly includes a plurality of constant-volume combustors arranged in a discharge nozzle for augmenting the jet thrust when the jet thrust is directed vertically.

---

This invention concerns improvements in or relating to gas turbine engines.

According to the invention there is provided a gas turbine engine having at least one duct through which the jet gases may be directed and a nozzle assembly communicating with said duct and comprising one or more compartments, the or each compartment being provided with constant-volume combustion means and with a discharge nozzle.

The constant-volume combustion means preferably comprises pulse jet means. Thus each constant-volume combustion means may comprise fuel burner means and inlet valve means, fuel supply means being provided for supplying each burner means with fuel.

The invention is particularly applicable to power plant for VTOL. or STOL. aircraft. Thus the said duct preferably extends perpendicularly to the axis of the engine. The engine itself may be adapted for the dual roles of producing forward and vertical thrust on an aircraft, in which case the engine would have in addition a jet pipe extending parallel to the axis of the engine and terminating in a final propulsion nozzle, said duct communicating with the jet pipe upstream of the final propulsion nozzle.

Preferably, in the case referred to above, closure means are provided in said jet pipe downstream of said duct, said closure means having an open position in which it permits the flow of jet gases through said final nozzle, and a closed position in which it permits the flow of jet gases exclusively through said duct.

The invention will be described, by way of example only, with reference to the accompanying drawings, in which:

FIGURE 1 is a simplified side view of a gas turbine engine according to an embodiment of the invention, showing portions in cut-away section;

FIGURE 2 is a view from below, in the direction of the arrow 2 of FIGURE 1, of part of the engine shown in FIGURE 1, and FIGURE 3 is a purely diagrammatic fragmentary sectional view taken on the line 3—3 of FIGURE 2 showing part of a nozzle assembly 20.

Referring to the drawings, a gas turbine engine 10 is of conventional construction, having compressor means 11, combustion equipment 12, turbine means 13 and a jet pipe 14, all in flow series. The jet pipe terminates in a final propulsion nozzle 15. The engine 10 may be installed in an aircraft (not shown) so that its axis extends parallel to the longitudinal axis of the aircraft, the nozzle 15 providing forward propulsive thrust.

A duct 16 communicates with the jet pipe 14 and extends perpendicularly thereto. In the region of the duct 16 the jet pipe 14 is provided with closure means 17 comprising a "clam shell" segmental valve member 18 mounted for pivotal movement about an axis 19 perpendicular to the axis of the jet pipe 14. In the closed position of the valve member 18, shown in full lines, the jet pipe 14 is blocked downstream of the duct 16, and the exhaust gases of the engine 10 are directed through the duct 16; in the open position of the valve member 18 (broken lines) the duct 16 is blocked and the exhaust gases pass through the final nozzle 15.

The closure means 17 has an open position, shown in broken lines in the broken-away sectional view of FIGURE 1, in which the flow of jet gases is permitted through the final nozzle 15, and a closed position, shown in full lines, in which the flow of jet gases through the final nozzle 15 is prevented, so that jet gases flow exclusively through the duct 16.

A nozzle assembly 20 communicates with the duct 16. The nozzle assembly 20 is of substantially rectangular section and comprises a rectangular matrix of compartments 21. Each compartment 21 (FIGURE 3) is provided with inlet valve means 22 which provide communication between the duct 16 and the compartment 21. The valve means 22, when open as shown in full lines, permit hot gases to enter the compartment 21 from the duct 16.

A fuel burner 23 which is supplied with fuel from a line 24 is disposed in each compartment 21. The fuel burners 23 are arranged for intermittent operation in the well-known manner of a pulse-jet, so that in operation of the fuel burners 23, constant-volume combustion takes place in each compartment 21. During each combustion cycle, the pressure within the compartment 21 causes the valve means 22 to close, as shown in broken lines, so that the products of combustion exhaust to atmosphere through the open outlet end 25 of each compartment 21.

By employing constant-volume combustion in the compartments 21 an increase in thrust of approximately 20% is obtained compared with combustion at constant pressure. This is an important advantage, particularly when the invention is applied to a vertical lift nozzle, as shown, where the maximum thrust for a given size of engine is desirable.

With the closure means 17 in the open position jet gases pass through the final nozzle 15 to produce forward propulsive thrust in normal forward flight of the aircraft. For vertical take off and landing of the aircraft, the closure means 17 is placed in its closed position and fuel is supplied to the fuel burners of the nozzle assembly 20. Jet gases are then directed vertically downwardly to produce the desired vertical propulsive thrust.

I claim:
1. A jet propulsion power plant for use in VTOL or STOL aircraft comprising: a gas turbine engine mounted on an axis generally parallel to the longitudinal axis of the aircraft, said gas turbine engine including compressor means, combustion means, turbine means and a jet pipe arranged in flow series; a forward propulsion nozzle mounted on the downstream end of said jet pipe; a downwardly directed nozzle assembly communicating with said jet pipe upstream of the downstream end of the same for providing direct lift from the exhaust gases, said downwardly directed nozzle assembly including a downwardly facing discharge nozzle at its discharge end, said downwardly facing discharge nozzle have a plurality of compartments, and constant-volume combustion means in each of said plurality of compartments; and valve means in said jet pipe, said valve means having a forward propulsion position in which jet exhaust gases are permitted to flow exclusively through said forward propulsion nozzle and a direct lift position in which jet exhaust gases are permitted to flow exclusively through said nozzle assembly.

2. A jet propulsion power plant as claimed in claim 1 wherein each of said constant-volume combustion means is a pulse jet means in each of said compartments, each pulse jet means including fuel burner means and inlet valve means, and fuel supply means connected to each fuel burner means for supplying the same with fuel.

3. A jet propulsion power plant as claimed in claim 1 wherein each of said compartments is substantially rectangular in section and wherein said plurality of compartments are arranged in a rectangular matrix in said downwardly facing discharge nozzle.

4. A jet propulsion power plant as claimed in claim 1 wherein said valve means includes a sgemental valve member mounted for pivotal movement in said jet pipe on an axis extending perpendicularly to the axis of the jet pipe.

References Cited

UNITED STATES PATENTS

| | | | |
|---|---|---|---|
| 2,635,420 | 4/1953 | Jonker | 60—247 X |
| 2,857,119 | 10/1958 | Morguloff | 60—229 X |
| 2,944,393 | 7/1960 | Fox | 60—229 |
| 3,130,543 | 4/1964 | Oldfield et al. | 60—229 |

FOREIGN PATENTS

| | | |
|---|---|---|
| 1,064,817 | 2/1958 | Germany. |

CARLTON R. CROYLE, *Primary Examiner.*